US008138964B2

(12) United States Patent
Donovan

(10) Patent No.: US 8,138,964 B2
(45) Date of Patent: Mar. 20, 2012

(54) TRACKING AIR AND GROUND VEHICLES

(75) Inventor: Timothy P. Donovan, Groton, MA (US)

(73) Assignee: Raytheon Company, Waltham, PA (US)

( * ) Notice: Subject to any disclaimer, the term of this patent is extended or adjusted under 35 U.S.C. 154(b) by 303 days.

(21) Appl. No.: 12/575,591

(22) Filed: Oct. 8, 2009

(65) Prior Publication Data

US 2010/0090891 A1 Apr. 15, 2010

Related U.S. Application Data

(60) Provisional application No. 61/104,309, filed on Oct. 10, 2008.

(51) Int. Cl.
*G01S 13/93* (2006.01)

(52) U.S. Cl. ................ 342/29; 342/30; 342/32; 342/37; 340/961

(58) Field of Classification Search .............. 342/29–37, 342/38–40; 340/961
See application file for complete search history.

(56) References Cited

U.S. PATENT DOCUMENTS

| | | | | | |
|---|---|---|---|---|---|
| 4,516,125 | A * | 5/1985 | Schwab et al. | ................ | 342/36 |
| 5,450,329 | A * | 9/1995 | Tanner | ................ | 701/213 |
| 5,570,095 | A * | 10/1996 | Drouilhet et al. | ........ | 342/357.31 |
| 5,574,648 | A | 11/1996 | Pilley | | |
| 5,636,123 | A * | 6/1997 | Rich et al. | ................ | 701/207 |
| 5,714,948 | A * | 2/1998 | Farmakis et al. | ............. | 340/961 |
| 6,462,697 | B1 | 10/2002 | Klamer et al. | | |
| 7,132,982 | B2 | 11/2006 | Smith et al. | | |
| 7,202,776 | B2 * | 4/2007 | Breed | ................ | 340/435 |
| 7,356,389 | B2 * | 4/2008 | Holst et al. | ................ | 701/3 |
| 7,358,857 | B1 | 4/2008 | White | | |
| 7,385,527 | B1 * | 6/2008 | Clavier et al. | ................ | 340/945 |
| 7,453,356 | B2 | 11/2008 | Bedenko | | |
| 7,479,901 | B2 | 1/2009 | Horstemeyer | | |
| 7,570,195 | B2 * | 8/2009 | Bartolini et al. | ................ | 342/37 |
| 7,965,227 | B2 * | 6/2011 | Kozhevnikov et al. | ....... | 342/145 |
| 2001/0018639 | A1 | 8/2001 | Bunn | | |
| 2003/0222819 | A1 | 12/2003 | Karr et al. | | |
| 2004/0056797 | A1 | 3/2004 | Knockeart et al. | | |
| 2005/0004759 | A1 * | 1/2005 | Siegel | ................ | 701/223 |

(Continued)

FOREIGN PATENT DOCUMENTS

EP 0613109 A1 8/1994

(Continued)

OTHER PUBLICATIONS

"Safety & Technology Trends", (Nov. 2008). Air Safety Week, 22(43), pp. 292-293. Retrieved from Career and Technical Education. (Document ID: 1592098431).*

(Continued)

*Primary Examiner* — John Sotomayor
(74) *Attorney, Agent, or Firm* — Daly, Crowley, Mofford & Durkee, LLP

(57) ABSTRACT

In one aspect, an air and ground vehicle tracking system includes a base station configured to transmit locations of air vehicles to a radio and a GPS receiver disposed in a ground vehicle and configured to derive a location of the ground vehicle. The radio is configured to receive locations of air vehicles, receive locations of other ground vehicles and broadcast a location of the ground vehicle to the base station. The system also includes a display configured to render locations of the air and ground vehicles.

20 Claims, 5 Drawing Sheets

U.S. PATENT DOCUMENTS

| | | | | |
|---|---|---|---|---|
| 2005/0007272 | A1* | 1/2005 | Smith et al. | 342/189 |
| 2005/0065682 | A1 | 3/2005 | Kapadia et al. | |
| 2005/0128104 | A1 | 6/2005 | Karabinis | |
| 2005/0222933 | A1 | 10/2005 | Wesby | |
| 2007/0115165 | A1* | 5/2007 | Breen et al. | 342/29 |
| 2007/0152804 | A1* | 7/2007 | Breed et al. | 340/435 |
| 2010/0002077 | A1* | 1/2010 | Viggiano et al. | 348/115 |
| 2010/0066604 | A1* | 3/2010 | Limbaugh et al. | 342/357.03 |
| 2010/0090891 | A1* | 4/2010 | Donovan | 342/357.07 |
| 2010/0283661 | A1* | 11/2010 | Strain et al. | 342/30 |

FOREIGN PATENT DOCUMENTS

WO WO 2004/114252 A1 12/2004

OTHER PUBLICATIONS

Notification of Transmittal of the International Search Report and the Written Opinion of the International Searching Authority, or the Declaration, PCT/US2009/059940, date of mailing Jan. 20, 2010, 7 pages.

Written Opinion of the International Searching Authority, PCT/US2009/059940, date of mailing Jan. 20, 2010, 7 pages.

Squid by Era, "Enhancing Airport Safety with Comprehensive Vehicle Tracking", SRA International, Inc. , downloaded Aug. 26, 2009, http://www.sra.com/era/squid/, 2 pages.

"Era Beyond Radar", An SRA International Subsidiary, SRA International, Inc., 11 pages.

"A whole new era is just the beginning . . . ", SRA International, Inc., www.sra.com/era, 3 pages.

Notification Concerning Transmittal of International Preliminary Report on Patentability (Chapter 1 of the Patent Cooperation Treaty), PCT/US2009/059940, date of mailing Apr. 21, 2011, 2 pages.

Written Opinion of the International Searching Authority, PCT/US2009/059940, date of mailing Apr. 21, 2011, 6 pages.

* cited by examiner

TRACKING AIR AND GROUND VEHICLES

RELATED APPLICATIONS

This application claims priority to provisional application Ser. No. 61/104,309, entitled "GROUND VEHICLE TRACKING SYSTEM," filed Oct. 10, 2008, which is incorporated herein in its entirety.

BACKGROUND

Automatic dependent surveillance-broadcast (ADS-B) is used by an air vehicle (e.g., an airplane) to periodically broadcast its position. Other air vehicles and/or ground stations having ADS-B compatible equipment can receive these broadcasts. In general, the air vehicle determines its position, for example, using a global navigation satellite system (GNSS) and then broadcasts its position using the 1090 Extended Squitter of Mode S transponders (i.e., ADS-B).

Ground vehicles are used on the airport surface and vicinity to support various functions, but typically do not include ADS-B equipment. For example, these ground vehicles include aircraft tow vehicles, baggage/cargo tugs, fuel trucks, catering trucks, de-icing vehicles, maintenance vehicles, snow plows, emergency vehicles and so forth.

SUMMARY

In one aspect, an air and ground vehicle tracking system includes a base station configured to transmit locations of air vehicles to a radio and a GPS receiver disposed in a ground vehicle and configured to derive a location of the ground vehicle. The radio is configured to receive locations of air vehicles, receive locations of other ground vehicles and broadcast a location of the ground vehicle to the base station. The system also includes a display configured to render locations of the air and ground vehicles.

In another aspect, a method to track vehicles includes receiving a location of a first ground vehicle, broadcasting the location of the first ground vehicle, receiving locations of air vehicles, receiving locations of other ground vehicles and rendering the locations of the air vehicles and the other ground vehicle.

In a further aspect, an article includes a machine-readable medium that stores executable instructions to track vehicles. The instructions cause a machine to receive a location of a first ground vehicle, broadcast the location of the first ground vehicle, receive locations of air vehicles, receive locations of other ground vehicles and render the locations of the air vehicles and the other ground vehicles.

In a still further aspect, an air and ground vehicle tracking system includes a base station configured to transmit locations of air vehicles to a radio and a GPS receiver disposed in a ground vehicle. The vehicle positions are rendered relative to the GPS location of the ground vehicle. The radio is configured to receive locations of air vehicles, receive locations of other ground vehicles and broadcast the GPS location of the ground vehicle to the base station and other ground vehicles.

DETAILED DESCRIPTION

Described herein are techniques to provide ground vehicles with air vehicle (e.g., aircraft) information such as air vehicle locations and identification (ID). In particular, aircraft reports from ADS-B, for example, and/or radar may be rebroadcast to ground vehicles. In one particular example, an operator of a ground vehicle may be able to determine locations of an air vehicle at an airport from a geographic display of the airport in the ground vehicle. Also described herein are techniques which enable other ground vehicles and/or a control tower to determine the locations of ground and air vehicles at the airport.

Figure 1:
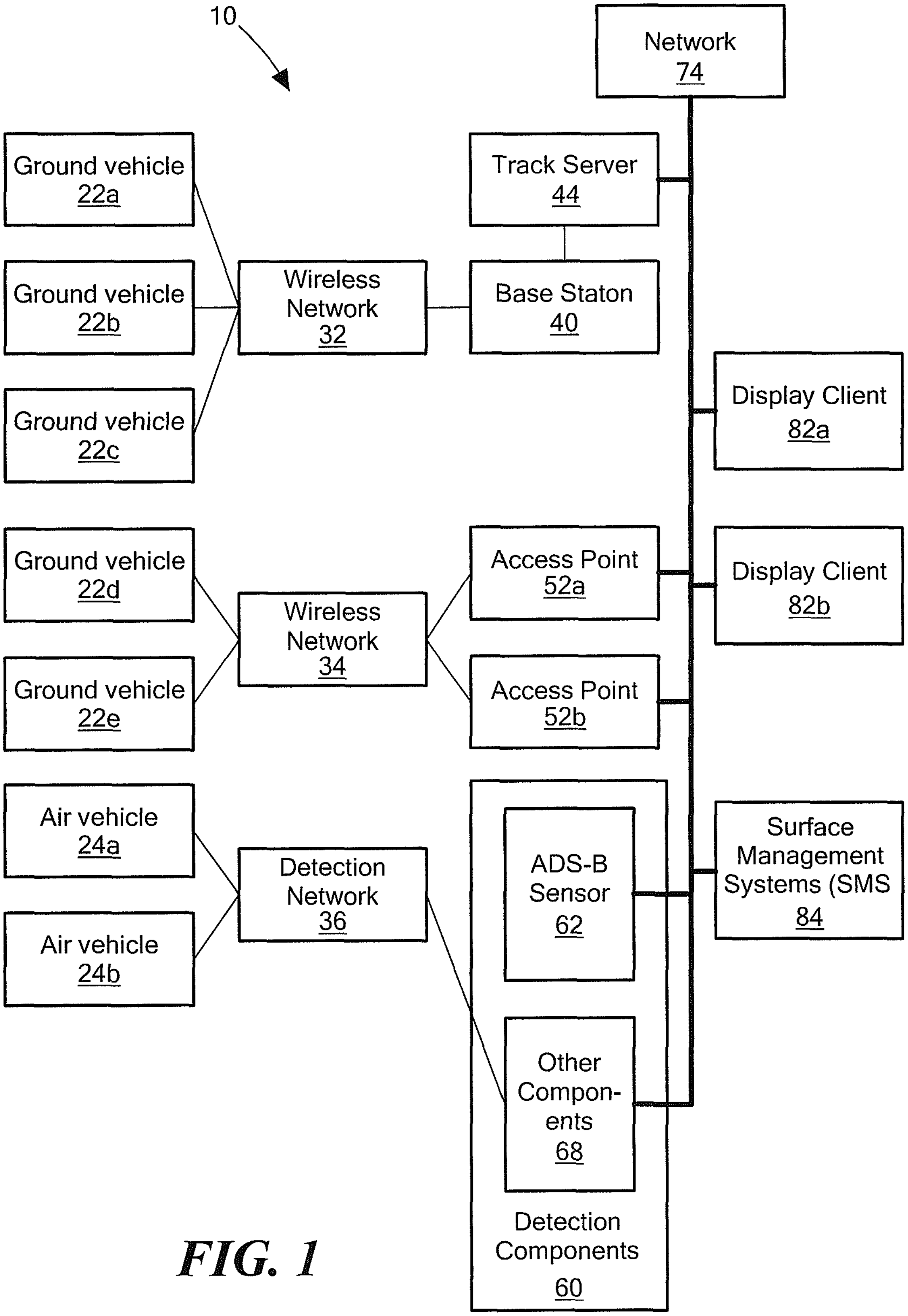
FIG. 1 is an example of a system to track air and ground vehicles.

Referring to FIG. 1, a system 10 is used to track ground and air vehicles. The system 10 includes ground vehicles (e.g., ground vehicles 22*a*-22*e*), air vehicles (air vehicles 24*a*-24*b*) and wireless networks (a wireless network 32, a wireless network 34 and a detection network 36).

The system 10 also includes a base station 40 to receive and provide messages to and from the ground vehicles (e.g., ground vehicles 22*a*-22*c*) using the wireless network 32. The base station 40 provides information including identification and location of the ground vehicles to a track server 44. In one example, the track server 44 aggregates and distributes vehicle track data (e.g., air vehicle data and ground vehicle data) to the display client 82*a* and 82*b*. In one example, the wireless network 32 is an Ultra High Frequency (UHF) time division multiple access (TDMA) network operating at assigned frequencies between 450 and 480 MHz.

The system 10 also includes access points 52 (e.g., access points 52*a*-52*b*) that receive identification and location information from ground vehicles (e.g., ground vehicles 22*d*-22*e*) through the wireless network 34. In one example, the access point 52*a* or 52*b* is an 802.11g or 802.11n wireless access point, which broadcasts an SSID and accepts connections from mobile wireless devices. Once connected to the access point 52*a* or 52*b*, a ground vehicle 22*a* sends encrypted location reports using TCP or UDP over IPv4 and 802.11 protocols, for example. In another example, the wireless network 34 is a WIMAX 5.1 GHz network. In other examples, the wireless network 34 may a digital cell 3GSM, Evolution-Data Optimized (EVDO) or a SATCOM provided by an Internet Service Provider (ISP).

The system 10 further includes detection components 60 to determine a location of air vehicles 24*a*-24*b* using the detection network 36 to detect non-participating vehicles. The detection components 60 include an Automatic Dependant Surveillance-Broadcast (ADS-B) sensor 62, and other detection components 68 including primary radar and electro-optical sensors for example. In one example, the ADS-B sensor 62 provides aircraft position reports which are used to provide an integrated display of aircraft and ground vehicles on an airport surface to vehicle dispatch and ramp operators, vehicle operators, a control tower and pilots of the air vehicles. In one example, the detection network 36 is a Secondary Search Radar (SSR) (e.g. ASR-9, ASR-11) operating at 1.03 and 1.09 GHz. Other detection components 68 may include Air Surveillance Radar (ASR) and Airport Surface Detection Equipment (ASDE) radar.

The track server 44, the access points 52*a*-52*b* and the detection components 60 are connected to a network 74. In one example, the network 74 is a local area network (LAN). In another example, the network 74 is a wide area network (WAN). The network 74 may be a wired, wireless or a combination of a wired and wireless network. In one particular example, the network 74 includes one or more Ethernet switches providing IPv4 connectivity between components connected to the network 74.

The network 74 is connected to display clients (e.g., a display client 82*a* and a display client 82*b*) and a Surface Management System (SMS) 84. The display client 82*a*-82*b* are configured to provide displays including geographical displays of an airport and further configured to render identification and location data on air and ground vehicles. The display clients 82*a*-82*b* may be located in a control tower, ramp operators facility and so forth.

Figure 2:
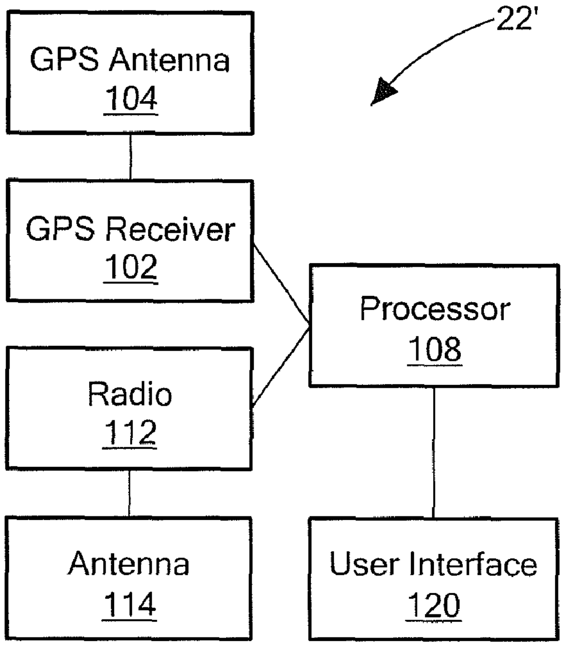
FIG. 2 is an example of components disposed at a ground vehicle.

Referring to FIG. 2, the ground vehicle 22*a*-22*e* may be configured as a ground vehicle 22', for example. The ground vehicle 22' includes a Global Position System (GPS) receiver 102 connected to a GPS antenna 104, a processor 108, a radio 112 connected to an antenna 114 (e.g., a wireless antenna) and a user interface 120.

The GPS receiver 102 uses time difference of arrival techniques using timing signals from multiple GPS satellites through the GPS antenna 104 to determine the location of the ground vehicle 22'. The location of the ground vehicle 22' is provided to the processor 108 (e.g., an embedded processor) connected to the GPS receiver 102. In one example, the GPS receiver 102 is a Wide Area Augmentation Services (WAAS) enabled Global Positioning System (GPS) receiver for improved position accuracy.

The radio 112 broadcasts and receives messages through the wireless antenna 114. In one example, the identification and location of the ground vehicle 22' is broadcast to the base station 40 and also to other ground vehicles. In another example, the ground vehicle 22' receives identification and locations from the other ground vehicles. In one particular example, the messages sent by the radio 112 are in the form of encrypted packets at a configured frequency using time division multiple access (TDMA) access control. The radio 112 may provide at least one of an Ultra High frequency (UHF), a WI-FI 802.16, a Worldwide Interoperability for Microwave Access (WIMAX), Evolution-Data Optimized (EVDO) or a High-Speed Downlink Packet Access (HSDPA) wireless link.

The radio 112 is also configured to receive identification and location information of air vehicles provided by the detection components 60 using the network 74 and the base station 40. In one example, the GPS receiver 102, the processor 108 and the radio 112 are a single unit (e.g., a Raveon Technologies Corporation RV-M7 wireless modem).

Figure 3:
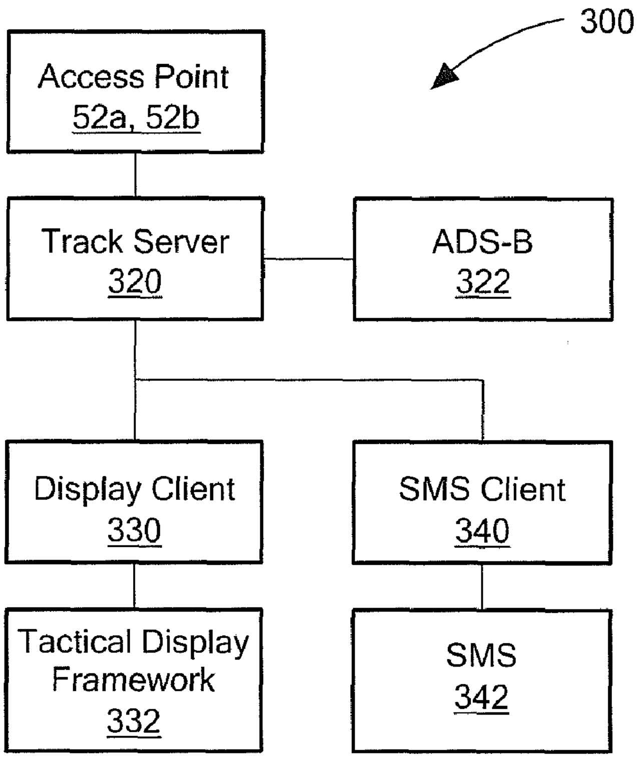
FIG. 3 is an example of software components used in the system of FIG. 1.

Referring to FIG. 3, a software architecture 300, for example, located at the base station 40, includes an ADS-B component 322 to receive air vehicle information (e.g., location and ID) and a track server component 320 receives the air vehicle information from an ADS-B sensors and ground vehicle information from the radio 112. In one example, the track server component 320 performs the functions similar to the track server 44 (FIG. 1). In one example, one or more components of the software architecture 300 may be disposed at the base station 40 such that the track server 44 and the base station 40 are combined. In another example, the track server component 320 is connected to one or more access points 52*a*, 52*b* through the network 74.

In one example, the track server component 320 includes non-real time software written in Java running on a LINUX® (or WINDOWS®) processor. Upon initialization, the track server component 320 reads the configuration parameters from a local disk. In one example, the configuration parameters include the IP multicast address(es) used for vehicle reports, and the minimum and maximum update intervals for track updates. A first thread is provided to join the vehicle multicast group, receive position updates and update the corresponding record in the vehicle track file with the latest time and position. If the previous report is older than the minimum update interval, the track update is published. Tracks may be published to subscribing automation systems as Asterix category 11 messages or via web services as XML messages over a JMS transport. A second thread is provided to identify stale tracks. A periodic timer is set to the maximum update interval. When the periodic timer expires the second thread iterates through the track file and identifies records that have not been updated. These records are marked as stale, but are re-published. This is intended to support initialization of new clients without retransmission of the entire track file. In one example, the track server component 320 identifies duplicate vehicle identifiers based on conflicting positions. In another example, the track server component 320 supports Unicast UDP and/or TCP clients.

The software architecture 300 also includes a display client 330 for providing air and ground vehicle information using a Tactical Display Framework (TDF) 332. In one example, the TDF 332 is a TDF manufactured by Raytheon Solipsys. The software architecture 300 further includes an SMS client 340 for providing air and ground vehicle information to external SMS automation 342.

Figure 4A:
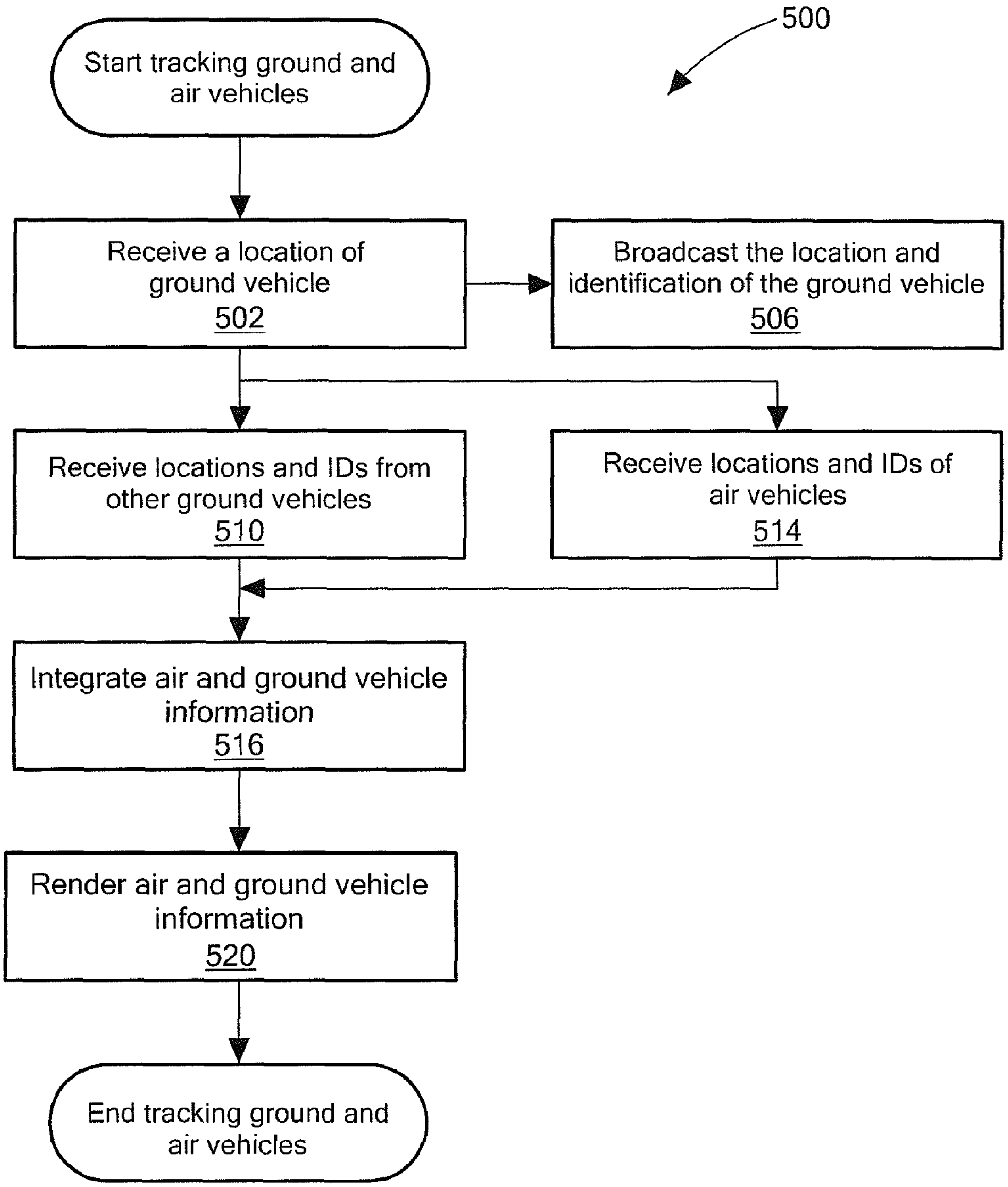
FIG. 4A is an example of a flowchart to track air and ground vehicles.

Referring to FIG. 4A, one example of a process to track ground and air vehicles at a ground vehicle is a process 500. A location of a ground vehicle is received (502). For example, the GPS receiver 102 receives a location of the ground vehicle 22' from a GPS satellite.

The identification of the ground vehicle 22' and the location of the ground vehicle are broadcast (506). For example, the processor 108 receives the location of the ground vehicle 22' from the GPS receiver 102 and the identification and location of the ground vehicle 22' is sent from the processor 108 for broadcast by the radio 112 using the antenna 114 to the base station 40.

The locations and IDs from other ground vehicles are received (510). For example, the radio 112 receives from the base station 40 the IDs and locations of the other vehicles.

Locations of air vehicle are received (514). For example, the detection components 60 determine the locations and IDs of the air vehicles 24*a*-24*b* and provide the locations and IDs to the network 74 for broadcast to other vehicles by the base station 40 using the wireless network 32.

Air vehicle information and ground vehicle information are integrated (516), for example, by the processor 108 and rendered (520). In one example, the air vehicle information includes locations and ID of the air vehicles and ground vehicle information includes locations and IDs of ground vehicles. The air and ground vehicles are rendered on the user interface 120, for example.

Figure 4B:
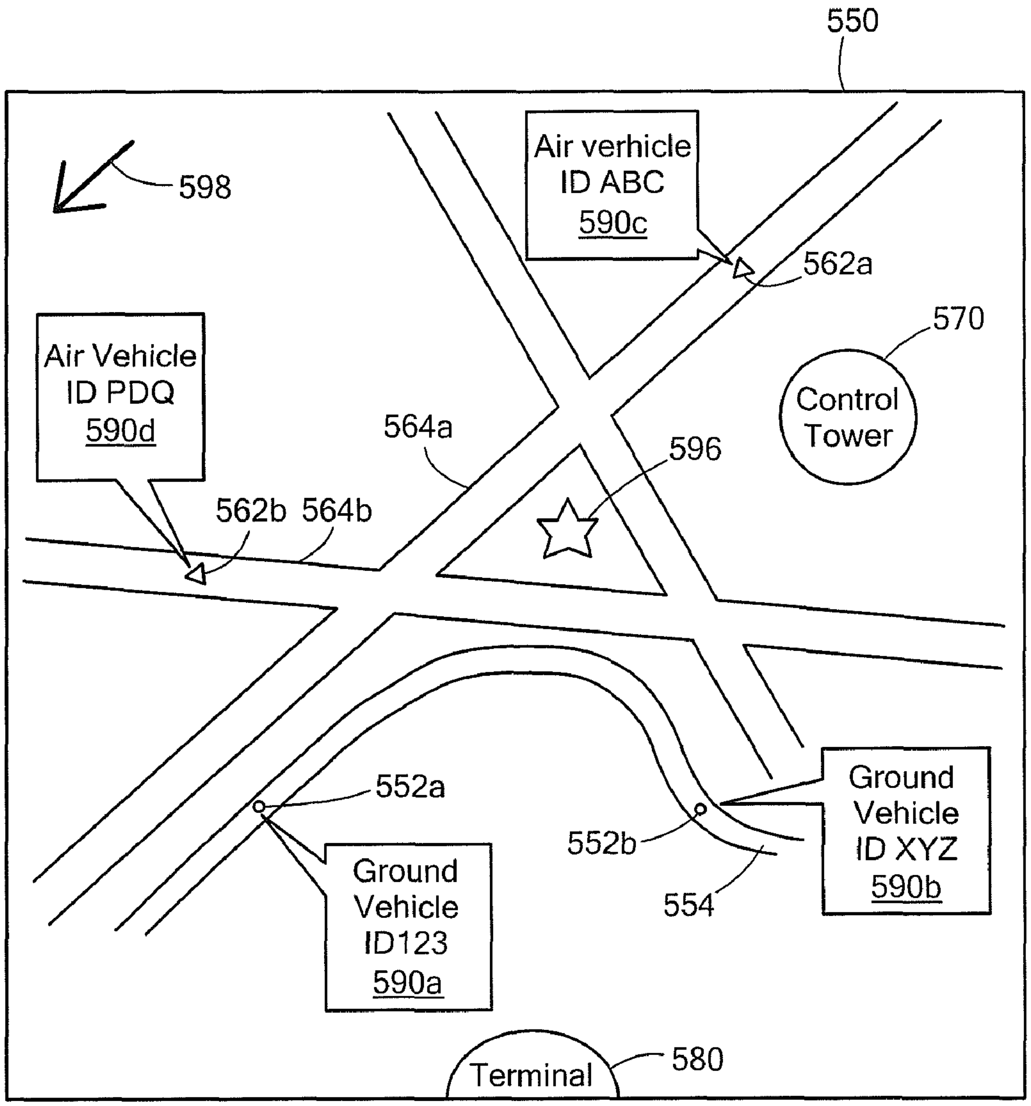
FIG. 4B is an example of a display to render ground and air vehicle locations.

Referring to FIG. 4B, an example of a display (e.g., a geographical display) to depict ground and air vehicles is a display 550. The display 550 depicts ground vehicles (e.g., a ground vehicle 552*a* and a ground vehicle 552*b*) on an airport surface 554 and air vehicles (an air vehicle 562*a* and an air vehicle 562*b*) on airport runways (e.g., on an airport runway 564*a* and an airport runway 564*b*, respectively). As used herein airport surfaces include ramps, taxiways, runways and so forth for which a ground vehicle is capable of traversing. The display 550 also depicts other geographical features such as a control tower 570 and a terminal 580 in a form of a map. The display 550 further depicts a type of vehicle and the ID of the vehicle. For example, each of the vehicles 552*a*, 552*b*, 562*a*, 562*b* includes a label (e.g., the ground vehicle 552*a* includes a label 590*a*, the ground vehicle 552*b* includes a label 590*b*, the air vehicle 562*a* includes a label 590*c* and the air vehicle 562*c* includes a label 590*c*) indicating the type of vehicle (e.g., air or ground) and an ID of the vehicle.

In one example, the display 550 is disposed at one of the ground vehicles (e.g., a primary ground vehicle (not shown)). The display 550 may also render a symbol (e.g., a symbol 596) to indicate the position of the primary ground vehicle so that an operator of the primary ground vehicle may determine its position relative to other vehicles (e.g., 562*a*, 562*b*, 552*a*, 552*b*). The display 550 may also include a directional symbol 598 that indicates the direction the primary ground vehicle is traveling. In one example, symbols 596 and 598 may be combined into one symbol. In other examples, the display 550 is a moving map that moves as the primary ground vehicle moves.

In other examples, the other ground vehicles 552*a*, 552*b* include their own respective display that includes relative ground and air vehicle information.

Figure 5:
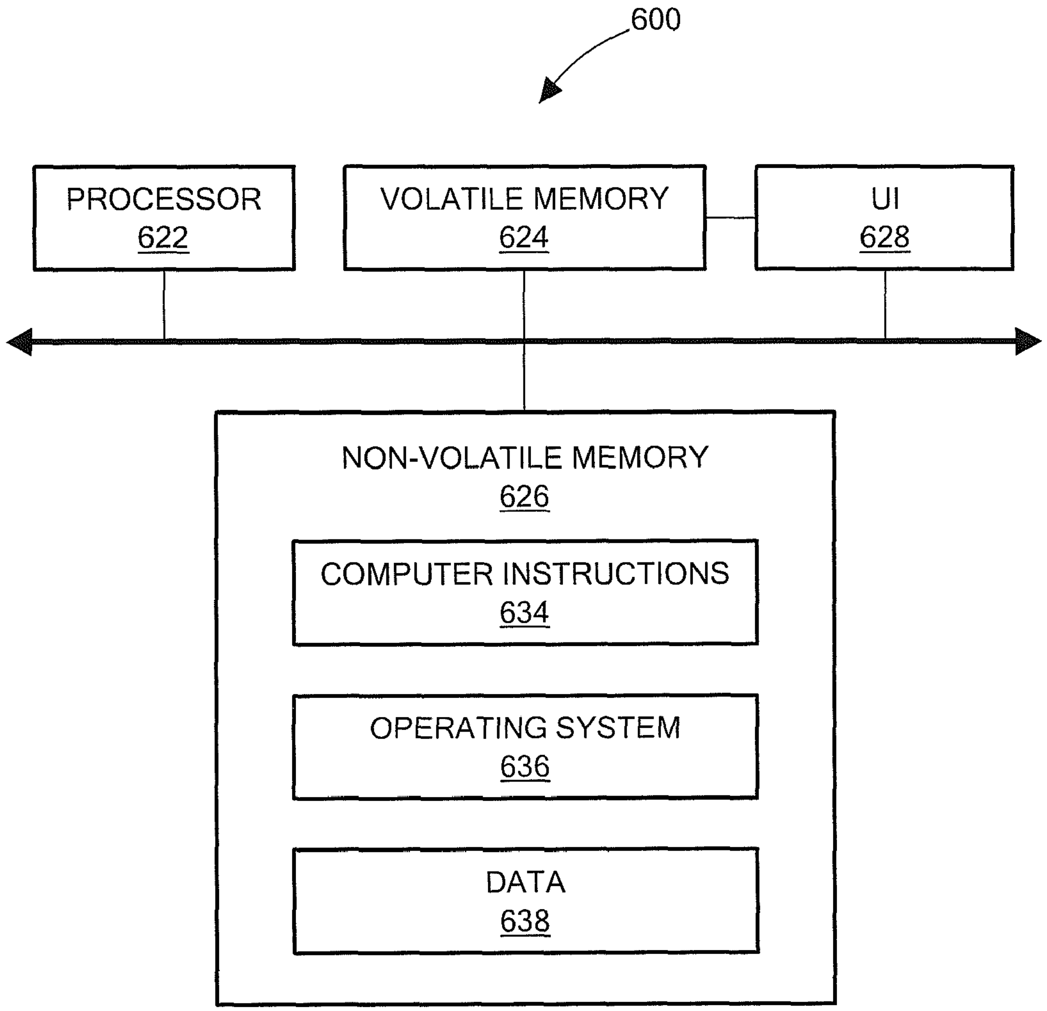
FIG. 5 is an example of a computer for which the process of FIG. 5A may be implemented.

Referring to FIG. 5, an example of a computer to provide ground and air vehicle tracking is a computer 600. In one example, the computer 600 is disposed at a ground vehicle (e.g., one of the ground vehicles 22*a*-22*e*). The computer 600 includes a processor 622, a volatile memory 624, a non-volatile memory 626 (e.g., a hard disk) and a user interface (UI) 628 (e.g., a mouse, a touch screen, a keyboard, a display (e.g., the display 550), and any combination thereof, for example). The non-volatile memory 626 stores computer instructions 634, an operating system 636 and data 638. In one example, the computer instructions 632 are executed by the processor 622 out of volatile memory 624 to perform all or part of the process 500.

The processes described herein (e.g., process 500) are not limited to use with the hardware and software configuration shown in FIG. 5; they may find applicability in any computing or processing environment and with any type of machine or set of machines that are capable of running a computer program. The processes described herein may be implemented in hardware, software, or a combination of the two. The processes described herein may be implemented as a set or subset of services in computer programs executed on programmable computers/machines that each includes a processor, a storage medium or other article of manufacture that is readable by the processor (including volatile and non-volatile memory and/or storage elements), at least one input device, one or more output devices, and a network connection. Program code may be applied to data entered using an input device to perform the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein (e.g., process 500). The processes described herein may also be implemented as a machine-readable storage medium, configured with a computer program, where upon execution, instructions in the computer program cause the computer to operate in accordance with the processes.

The processes described herein are not limited to the specific embodiments described. For example, the process 500 is not limited to the specific processing order of FIG. 4A. Rather, any of the processing blocks of FIG. 4A may be re-ordered, combined or removed, performed in parallel or in serial, as necessary, to achieve the results set forth above.

The processing blocks in FIG. 4A associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. An air and ground vehicle tracking system comprising:

a base station configured to transmit locations of air vehicles to a radio disposed in a ground vehicle; and a GPS receiver disposed in the ground vehicle and configured to derive a location of the ground vehicle;

the radio configured to:

receive the locations of air vehicles from the base station;

receive locations of other ground vehicles;

broadcast a location of the ground vehicle to the base station; and a display configured to render the locations of the air and ground vehicles at an airport, wherein the display is disposed at one of the ground vehicle, the other ground vehicles or a control tower at the airport.

2. The system of claim 1 wherein the radio broadcasts using at least one of Ultra High frequency (UHF), WI-FI, Worldwide Interoperability for Microwave Access (WIMAX), Evolution-Data Optimized (EVDO) or High-Speed Downlink Packet Access (HSDPA) wireless links.

3. The system of claim 1 wherein the base station is further configured to transmit the locations of the air vehicles derived from at least one of Automatic Dependant Surveillance-Broadcast (ADS-B), Air Surveillance Radar (ASR) and Airport Surface Detection Equipment (ASDE).

4. The system of claim 1 wherein the display is further configured to identify the air and ground vehicles.

5. The system of claim 1 wherein the GPS receiver is a Wide Area Augmentation Services (WAAS) enabled Global Positioning System (GPS) radio.

6. A method to track vehicles comprising:

determining a location of a first ground vehicle;

broadcasting the location of the first ground vehicle from the first ground vehicle to other ground vehicles using a radio disposed at the first ground vehicle;

receiving locations of air vehicles from a base station using the radio;

receiving locations of the other ground vehicles from the other ground vehicles; and rendering the locations of the air vehicles and the ground vehicles at an airport on a display disposed at one of the first ground vehicle, the other ground vehicles or a control tower at the airport.

7. The method of claim 6 wherein broadcasting the location of the first ground vehicle comprises broadcasting the location of the first ground vehicle using at least one of Ultra High frequency (UHF), WI-FI, Worldwide Interoperability for Microwave Access (WIMAX), Evolution-Data Optimized (EVDO) or High-Speed Downlink Packet Access (HSDPA) wireless links.

8. The method of claim 6 wherein receiving locations of air vehicles comprises receiving locations of air vehicles derived from at least one of Automatic Dependant Surveillance-Broadcast (ADS-B), Air Surveillance Radar (ASR) and Airport Surface Detection Equipment (ASDE).

9. The method of claim 6 wherein rendering the locations of the air vehicles and the other ground vehicles comprises rendering the locations of the air vehicles and the ground vehicles using a geographical display disposed at the first ground vehicle.

10. The method of claim 6, further comprising transmitting an identification of the first ground vehicle.

11. The method of claim 6, further comprising receiving identifications and locations of the other ground vehicles.

12. The method of claim 6 wherein receiving the locations of the other ground vehicles comprises receiving broadcasts of locations of other ground vehicles sent by the other ground vehicles.

13. The method of claim 6 wherein receiving a location of a first ground vehicle comprises receiving a location of the first ground vehicle using a global positioning system (GPS) receiver disposed at the first ground vehicle.

14. An article comprising:

a non-transitory machine-readable medium that stores executable instructions to track vehicles, the instructions causing a machine to:

determine a location of a first ground vehicle;

broadcast the location of the first ground vehicle from the first ground vehicle to other ground vehicles using a radio disposed at the first ground vehicle;

receive locations of air vehicles from a base station;

receive locations of the other ground vehicles from the other ground vehicles; and render the locations of the air vehicles and the other ground vehicles in and around an airport on a display disposed at the first ground vehicle.

15. The article of claim 14 wherein the instructions to broadcast the location of the first ground vehicle comprises instructions to broadcast the location of the first ground vehicle using at least one of Ultra High frequency (UHF), WI-FI, Worldwide Interoperability for Microwave Access (WIMAX), Evolution-Data Optimized (EVDO) or High-Speed Downlink Packet Access (HSDPA) wireless links.

16. The article of claim 14 wherein the instructions to receive locations of air vehicles comprises instructions to receive locations of air vehicles derived from at least one of Automatic Dependant Surveillance-Broadcast (ADS-B) and Air Surveillance Radar (ASR) and Airport Surface Detection Equipment (ASDE).

17. The article of claim 14 wherein the instructions to render the locations of the air vehicles and the other ground vehicles comprises instructions to render the locations of the air vehicles and the other ground vehicles using a geographical display disposed at the first ground vehicle.

18. The article of claim 14, further comprising instructions to:

transmit an identification of the first ground vehicle; and receive identifications and locations of the other ground vehicles.

19. The article of claim 14 wherein instructions to receive the locations of the other ground vehicles comprises instructions to receive broadcasts of locations of other ground vehicles sent by the other ground vehicles.

20. The article of claim 14 wherein the instructions to receive a location of a first ground vehicle comprises instructions to receive a location of the first ground vehicle using a global positioning system (GPS) receiver disposed at the first ground vehicle.

* * * * *